Figure 1:
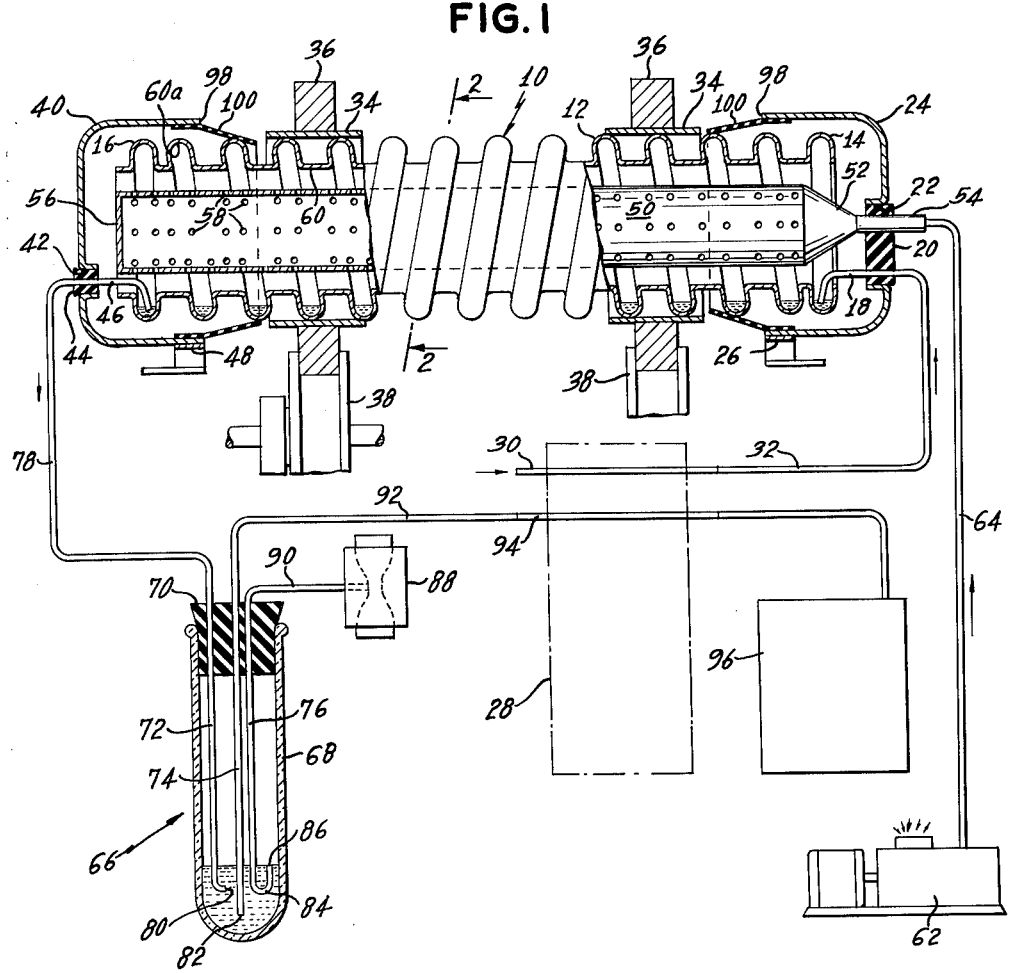

Dec. 28, 1965  A. FERRARI  3,226,198

METHOD AND APPARATUS FOR TREATING GASES

Filed Oct. 18, 1962

INVENTOR.
ANDRES FERRARI
BY *Harry Cole*

ATTORNEY

United States Patent Office 3,226,198
Patented Dec. 28, 1965

3,226,198
METHOD AND APPARATUS FOR
TREATING GASES
Andres Ferrari, Scarsdale, N.Y., assignor to Technicon Instruments Corporation, Chauncey, N.Y., a corporation of New York
Filed Oct. 18, 1962, Ser. No. 231,537
18 Claims. (Cl. 23—232)

This invention relates to the treatment of gases for determining the quantity of a substance present in the gas.

One object of the invention is to provide a method and apparatus for bringing the gas into intimate contact with a thin film of a liquid reagent for reaction of all or substantially all of a substance in the gas with the reagent, whereby minute quantities of the substance, if present in the gas, can be accurately determined quantitatively.

Another object is generally to provide an improved method and apparatus for determining the quantity of a substance present in the gas, and which is especially well adapted for use in connection with air pollution studies.

The above and other objects, features and advantages of the invention will be more clearly understood from the following description of the invention considered in connection with the accompanying illustrative drawings.

Figure 2:
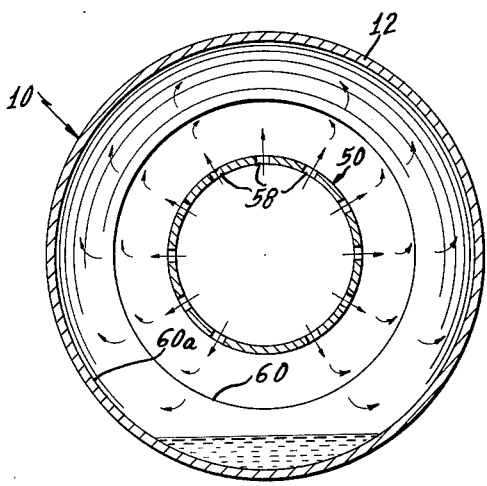

In the drawings:

FIG. 1 is a vertical sectional view illustrating the apparatus and method of the present invention with certain parts of the apparatus illustrated more-or-less diagrammatically; and FIG. 2 is a cross section, on a larger scale, taken on line 2—2 of FIG. 1.

According to the invention, briefly described, a liquid reagent is formed into a relatively thin film on the inner surface of a vessel and a gas, for example air, is caused to impinge on the film so that a substance, if present in the air, reacts with the reagent to form a reaction product in a quantity proportional to the quantity of the substance present in the air. The resulting liquid, containing the reaction product, is then treated and analyzed to determine the quantity of the resulting reaction product which provides a measurement of the quantity of the substance in the air. The apparatus is especially useful in connection with air pollution studies to determine the quantity of contaminants which might be present in the air, and this is done with an extremely high degree of accuracy even though the contaminants may be present in minute quantities. This is accomplished, in accordance with the invention, by forming the reagent into a thin film and directing the air or gas against the film in a manner which insures that all or substantially all of the substance in the gas or air is brought into intimate contact with the reagent for reaction therewith.

Referring now to the drawings in detail, the apparatus comprises a horizontal cylindrical rotary vessel 10 which is preferably made of glass sold under the trademark "Pyrex," and the vessel is provided with a helical groove 12 which extends along the inner surface of the vessel. A circular groove 14 is provided at the inlet end of the vessel and a circular groove 16 is provided at the outlet end of the vessel, and helical groove 12 extends longitudinally of the vessel from groove 14 to groove 16 for conveying a liquid reagent longitudinally of the vessel from its inlet end to its outlet end. The liquid reagent, which is of a type that reacts with a substance present in the gas, is introduced into groove 14 by a stationary inlet tube 18 that is suitably mounted in a plug or tube holder 20 that is mounted in an opening 22 which is provided in a stationary inlet cap 24. The inlet cap encircles and encloses the inlet end of the vessel and is suitably supported on the housing of the apparatus by a bracket 26. A predetermined quantity of the liquid reagent is transmitted to tube 18 by the action of a proportioning pump 28, via pump tube 30 and conduit 32. The proportioning pump is preferably of the type shown and described in U.S. Patent No. 2,935,028 issued May 3, 1960.

The vessel is mounted for rotation about its horizontal longitudinal axis by rings 34 which engage the outer surface of the vessel, adjacent each end thereof, and straddle two or more convolutions of the helix as shown. Each ring is provided with a roller 36 and the rollers 36 are operated by rollers 38 driven by suitable means, as shown in my U.S. Patent No. 3,020,130 issued February 6, 1962.

The outlet end of the vessel is surrounded and enclosed by another stationary outlet end cap 40 which is provided with an opening 42 in which is mounted a tube holder 44 that supports a take-off tube 46. The outlet-end cap is suitably supported by a bracket 48 to the housing of the apparatus. The function of the take-off tube is to withdraw predetermined quantities of the resulting reacted liquid from the outlet groove 16 of the vessel in a manner which will be more fully understood hereinafter.

A gas transmitting tube 50 extends within vessel 10, longitudinally thereof, and is provided with a gas inlet end 52 that has a tubular inlet part 54 which is suitably supported in holder 20. The opposite end 56 of the tube is closed, as shown. A plurality of outlet openings 58 are provided along the length of the tube for directing the gas against the inner wall 60 of the vessel. The gas or air which is to be treated for analysis is introduced into inlet 54 of the gas tube 50 by the action of an air pump 62 through a conduit 64 which is connected to the inlet of the gas tube, and it will be understood that the air pump is operable to transmit relatively large quantities of gas to the tube.

During the operation of the apparatus, the liquid reagent is introduced into the groove 14 from inlet tube 18 and is conveyed, by helical groove 12, during the rotation of vessel 10 to outlet groove 16, and is withdrawn therefrom by take-off tube 46. Due to the rotation of the vessel, the bottom and adjacent side walls 60a of the groove are coated with the liquid reagent and a thin film of the reagent forms along the inner surface of the groove. As best seen in FIG. 2, the gas from tube 50 flows through outlet openings 58, in the form of individual jet streams which impinge on surfaces 60 and 60a normal to said surfaces, so that the substance present in the gas is brought into intimate contact with thin films of the reagent and substantially all, if not all, of the substance reacts with the reagent to form a reaction product in an amount depending upon the quantity of the substance in the gas.

A liquid receiver 66 is connected in liquid flow communication with take-off tube 46 and is operable, in conjunction with other elements of the apparatus, to aspirate liquid from groove 16 of the vessel during the rotation thereof and while liquid is being introduced into the vessel. The liquid receiver comprises a cylindrical-shaped open-ended vessel 68, preferably made of heat-resistant glass. The open end of the vessel is closed by a plug 70 which supports tubes 72, 74 and 76. Tube 72 is an aspirating tube and is connected to the take-off tube 46 by a conduit 78, and the outlet end 80 of tube 72 is positioned in the lower part of the vessel for delivering the withdrawn liquid thereto. Tube 74 is an aspirating tube and has its inlet end 82 below outlet end 80 of tube 72 and is operable to withdraw liquid from the vessel, in the form of a continuous stream, for treatment for analysis as will be more fully understood hereinafter. Tube 76 has a U-shaped lower part 84 which has an inlet end 86 that is above ends 80 and 82 of the other tubes. Tube 76 is connected to a suitable source of a vacuum so that the pressure in vessel 68 is below atmosphere, whereby the liquid receiver 66 is operable to aspirate liquid from vessel 10 into vessel 68 via take-off tube 46, conduit 78 and tube 72, respectively. The inlet end 86 also provides an outlet for any excess liquid above the level of end 86, and the quantity of the excess liquid in vessel 68 depends upon the rates of flow of the liquid through inlet tube 72 and outlet tube 74. The flow rates are such that the inlet end 82 of tube 74 is always below the level of the liquid in vessel 68. The vertical position of end 86 may be adjusted to vary the level of the liquid in vessel 68.

The suction provided in vessel 68 can be provided by an aspirator 88 which is of a well-known type and the extending part 90 of tube 76 is connected to the aspirator, as shown, for providing sub-atmospheric pressure in vessel 68. The extending part 92 of tube 74 is connected to an aspirating pump tube 94 which withdraws a predetermined quantity of the liquid from vessel 68.

During the operation of the apparatus, the liquid reagent is conveyed to outlet groove 16 and is continuously withdrawn therefrom as successive portions of the liquid flow into said groove. The sub-atmospheric pressure in vessel 68 is adjusted so that the liquid is aspirated from groove 16 very rapidly, as portions of the liquid flow therein and periodically, during the flow of the liquid, the inlet end of take-off tube 46 is uncovered by the liquid and is exposed to the space in the vessel. Air or gas which is present in said space flows through tube 46 into vessel 68 and bubbles through the liquid in the bottom of the vessel so that the liquid is agitated and successive portions of the liquid which are collected in the vessel are mixed together. The quantity of liquid transmitted through tube 18 in relation to the rotational speed of vessel 10 is such as to preclude the liquid from overflowing from one convolution into an adjacent convolution, whereby successive portions of the liquid in groove 12 do not mix with each other.

A portion of the liquid from the vessel is aspirated therefrom through the action of aspirating pump 94 and is treated and analyzed with respect to the reaction product to determine its quantity by a continuous analysis apparatus 96 of the type shown in U.S. Patent No. 2,797,149 issued June 25, 1957. Any excess liquid in vessel 68, which rises above the level of inlet end 86 of tube 76, is aspirated from the vessel and is discharged through aspirator 88.

The marginal edge portions 98 of the end caps 24 and 40 can be provided with flexible circular rings 100 which resiliently engage the outer surface of vessel 10, in sliding relation therewith, and prevent major amounts of air or gas from the space in which the apparatus is located from entering the vessel and thereby contaminating the liquid reagent.

While gas tube 50 has been shown supported at one of its ends by end cap 24, it will be understood, of course, that the tube can be supported at both its ends by end caps 24 and 40, respectively.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Liquid-gas contact apparatus, comprising a liquid vessel mounted horizontally for rotation about its longitudinal horizontal axis and having a liquid inlet and a liquid outlet longitudinally spaced from said inlet, said vessel having a helical groove along its inner surface extending between said inlet and said outlet for conveying a liquid reagent stream from said inlet to said outlet during the roation of said vessel and for concomitantly providing a film of said reagent on the inner surface of said groove, a tube positioned in said vessel and extending longitudinally thereof for directing gas against said film of reagent for reaction of a substance in said gas with said reagent, said tube having an inlet for the gas and a series of outlet openings along the length of said tube for directing said gas against said film, and pump means connected to said gas inlet for introducing the gas into said tube.

2. Liquid-gas contact and analysis apparatus, comprising a liquid vessel mounted horizontally for rotation about its longitudinal horizontal axis and having a liquid inlet and a liquid outlet longitudinally spaced from said inlet, said vessel having means operable during the rotation of said vessel for transmitting a liquid reagent from said inlet to said outlet and for concomitantly providing a film of said reagent on at least a portion of the inner surface of said vessel, means positioned in said vessel and extending longitudinally thereof for directing gas against said film of reagent for reaction of a substance in said gas with said reagent, pump means connected to said last mentioned means for transmitting said gas thereto, other pump means in fluid flow communication with said vessel and operable concomitantly with said first mentioned pump means for transmitting predetermined quantities of said reagent to said inlet of said vessel and for transmitting predetermined quantities of the resulting reaction product from said outlet of said vessel, in the form of a stream, and means in fluid flow communication with said other pump means for analyzing said stream in respect to said reaction product.

3. Liquid-gas contact and analysis apparatus, comprising a liquid vessel mounted horizontally for rotation about its longitudinal horizontal axis and having a liquid inlet and a liquid outlet longitudinally spaced from said inlet, said vessel having a helical groove along its inner surface extending between said inlet and said outlet for conveying a liquid reagent stream from said inlet to said outlet during the rotation of said vessel and for concomitantly providing a film of said reagent on the inner surface of said groove, a tube positioned in said vessel and extending longitudinally thereof for directing gas against said film of reagent for reaction of a substance in said gas with said reagent, said tube having an inlet for the gas and a series of outlet openings along the length of said tube for directing said gas against said film, pump means connected to said last mentioned means for transmitting said gas thereto, other pump means in fluid flow communication with said vessel and operable concomitantly with said first mentioned pump means for transmitting predetermined quantities of said reagent to said inlet of said vessel and for transmitting predetermined quantities of the resulting reaction product from said outlet of said vessel, in the form of a stream, and means in fluid flow communication with said other pump means for analyzing said stream in respect to said reaction product.

4. Liquid-gas contact apparatus, comprising a liquid vessel mounted horizontally for rotation about its longitudinal horizontal axis and having a liquid inlet and a liquid outlet longitudinally spaced from said inlet, said vessel having means operable during the rotation of said vessel for transmitting a liquid reagent from said inlet to said outlet and for concomitantly providing a film of said reagent on at least a portion of the inner surface of said vessel, means positioned in said vessel and extending longitudinally thereof for directing gas against said film of reagent for reaction of a substance in said gas with said reagent, means in fluid flow communication with said outlet of said vessel for receiving the resulting liquid containing said reaction product, said receiving means comprising a second vessel having an inlet to receive said resulting liquid from said first mentioned vessel and an outlet conduit for the flow of liquid from said second vessel, and means in communication with said second vessel for producing sub-atmospheric pressure in said second vessel for inducing the flow of the resulting liquid from said first mentioned vessel to said second vessel and operable to introduce gas into said second vessel through said inlet of said second vessel for agitating the liquid therein.

5. Liquid-gas contact apparatus, comprising a liquid vessel mounted horizontally for rotation about its longitudinal horizontal axis and having a liquid inlet and a liquid outlet longitudinally spaced from said inlet, said vessel having a helical groove along its inner surface extending between said inlet and said outlet for conveying a liquid reagent stream from said inlet to said outlet during the rotation of said vessel and for concomitantly providing a film of said reagent on the inner surface of said groove, a tube positioned in said vessel and extending longitudinally thereof for directing gas against said film of reagent for reaction of a substance in said gas with said reagent, said tube having an inlet for the gas and a series of outlet openings along the length of said tube for directing said gas against said film, means in fluid flow communication with said outlet of said vessel for receiving the resulting liquid containing said reaction product, said receiving means comprising a second vessel having an inlet to receive said resulting liquid from said first mentioned vessel and an outlet for the flow of liquid from said second vessel, and means in communication with said second vessel for producing sub-atmospheric pressure in said second vessel for inducing the flow of the resulting liquid from said first mentioned vessel to said second vessel and operable to introduce gas into said second vessel through said inlet of said second vessel for agitating the liquid therein.

6. Liquid-gas contact and analysis apparatus, comprising a liquid vessel mounted horizontally for rotation about its longitudinal horizontal axis and having a liquid inlet and a liquid outlet longitudinally spaced from said inlet, said vessel having means operable during the rotation of said vessel for transmitting a liquid reagent from said inlet to said outlet and for concomitantly providing a film of said reagent on at least a portion of the inner surface of said vessel, means positioned in said vessel and extending longitudinally thereof for directing gas against said film of reagent for reaction of a substance in said gas with said reagent, means in fluid flow communication with said outlet of said vessel for receiving the resulting liquid containing said reaction product, said receiving means comprising a second vessel having an inlet to receive said resulting liquid from said first mentioned vessel and an outlet for the flow of liquid from said second vessel, and means in communication with said second vessel for producing sub-atmospheric pressure in said second vessel for inducing the flow of the resulting liquid from said first mentioned vessel to said second vessel and operable to introduce gas into said second vessel through said inlet of said second vessel for agitating the liquid therein, and means in fluid flow communication with said outlet of said second vessel for analyzing the liquid flowing therethrough with respect to the reaction product.

7. Liquid-gas contact and analysis apparatus, comprising a liquid vessel mounted horizontally for rotation about its longitudinal horizontal axis and having a liquid inlet and a liquid outlet longitudinally spaced from said inlet, said vessel having a helical groove along its inner surface extending between said inlet and said outlet for conveying a liquid reagent stream from said inlet to said outlet during the rotation of said vessel and for concomitantly providing a film of said reagent on the inner surface of said groove, a tube positioned in said vessel and extending longitudinally thereof for directing gas against said film of reagent for reaction of a substance in said gas with said reagent, said tube having an inlet for the gas and a series of outlet openings along the length of said tube for directing said gas against said film, means in fluid flow communication with said outlet of said vessel for receiving the resulting liquid containing said reaction product, said receiving means comprising a second vessel having an inlet to receive said resulting liquid from said first mentioned vessel and an outlet for the flow of liquid from said second vessel, means coupled to said outlet of said second vessel for producing sub-atmospheric pressure in said second vessel for inducing flow of the resulting liquid from said first mentioned vessel to said second vessel and to introduce gas into said second vessel through said inlet of said second vessel for agitating the liquid therein, and means in fluid flow communication with said outlet for analyzing the liquid flowing therethrough in respect to said reaction product.

8. Liquid-gas contact apparatus, comprising a liquid vessel mounted horizontally for rotation about its longitudinal horizontal axis and having a liquid inlet and a liquid outlet longitudinally spaced from said inlet, said vessel having a helical groove along its inner surface extending between said inlet and said outlet for conveying a liquid reagent stream from said inlet to said outlet during the rotation of said vessel and for concomitantly providing a film of said reagent on the inner surface of said groove, and a tube positioned in said vessel and extending longitudinally thereof, said tube having an inlet for gas at one of its ends and being closed at its opposite end, and a plurality of gas outlet holes in said tube longitudinally spaced from each other along at least a portion of the length of said tube in fluid communication with the interior of said tube and said vessel and positioned for directing gas from said tube against the inner wall of said vessel along longitudinally extending portions thereof, so that said gas impinges on said film of reagent for reaction of a substance in said gas with said reagent.

9. Liquid-gas contact apparatus, comprising: a vessel mounted substantially horizontally for rotation about its longitudinal horizontal axis, having an inlet for liquid, an outlet for liquid longitudinally spaced from said inlet, first means operable during rotation of said vessel for transporting a liquid from said inlet to said outlet and for concomitantly providing a film of this liquid on at least a portion of the inner surface of said vessel; supply means in fluid flow communication with said inlet for supplying predetermined quantities of a liquid reagent to said vessel; a tube disposed in said vessel and extending longitudinally thereof for directing gas against the film of liquid on said inner surface of said vessel, having an inlet for gas and a series of outlets along its length; and supply means coupled to said inlet of said tube for supplying gas thereto, which gas is discharged by said outlets against the liquid reagent film for the reaction of an ingredient in the gas with the reagent.

10. Liquid-gas contact apparatus, comprising: a vessel mounted substantially horizontally for rotation about its longitudinal horizontal axis, having an inlet for liquid, an outlet for liquid longitudinally spaced from said inlet, first means operable during rotation of said vessel for transporting a liquid from said inlet to said outlet and for concomitantly providing a film of this liquid on at least a portion of the inner surface of said vessel; supply means in fluid flow communication with said inlet for supplying predetermined quantities of a liquid reagent to said vessel; a tube disposed in said vessel and extending longitudinally thereof for directing gas against the film of liquid on said inner surface of said vessel, having an inlet for gas and a series of outlets along its length; and supply means coupled to said inlet of said tube for supplying gas thereto, which gas is discharged by said outlets against the liquid reagent film for the reaction of an ingredient in the gas with the reagent; and withdrawal means coupled to said outlet for withdrawing predetermined quantities of the product of the reaction of the gas with the liquid reagent from said vessel.

11. Liquid gas contact apparatus, comprising: a vessel mounted substantially horizontally for rotation about its longitudinal horizontal axis, having an inlet for liquid, an outlet for liquid longitudinally spaced from said inlet, first means operable during rotation of said vessel for transporting a liquid from said inlet to said outlet and for concomitantly providing a film of this liquid on at least a portion of the inner surface of said vessel; supply means in fluid flow communication with said inlet for supplying predetermined quantities of a liquid reagent to said vessel; a tube disposed in said vessel and extending longitudinally thereof for directing gas against the film of liquid on said inner surface of said vessel, having an inlet for gas and a series of outlets along its length; and supply means coupled to said inlet of said tube for supplying gas thereto, which gas is discharged by said outlets against the liquid reagent film for the reaction of an ingredient in the gas with the reagent; withdrawal means coupled to said outlet for withdrawing predetermined quantities of the product of the reaction of the gas with the liquid reagent from said vessel; and analysis means coupled to said withdrawal means for receiving predetermined quantities of this reaction product therefrom in the form of a stream and for continuously determining a characteristic of this stream.

12. Liquid-gas contact apparatus, comprising: a vessel mounted substantially horizontally for rotation about its longitudinal horizontal axis, having an inlet for liquid, an outlet for liquid longitudinally spaced from said inlet, first means operable during rotation of said vessel for transporting a liquid from said inlet to said outlet and for concomitantly providing a film of this liquid on at least a portion of the inner surface of said vessel; supply means in fluid flow communication with said inlet for supplying predetermined quantities of a liquid reagent to said vessel; a tube disposed in said vessel and extending longitudinally thereof for directing gas against the film of liquid on said inner surface of said vessel, having an inlet for gas and a series of outlets along its length; and supply means coupled to said inlet of said tube for supplying gas thereto, which gas is discharged by said outlets against the liquid reagent film for the reaction of an ingredient in the gas with the reagent; withdrawal means coupled to said outlet for withdrawing predetermined quantities of the product of the reaction of the gas with the liquid reagent from said vessel; a flow cell coupled to said withdrawal means for receiving predetermined quantities of this reaction product in the form of a stream; and a light source and a light detector operable at a given wave length for continuously determining the optical density of this stream.

13. Liquid-gas contact apparatus, comprising: a vessel mounted substantially horizontally for rotation about its longitudinal horizontal axis, having an inlet for liquid, an outlet for liquid longitudinally spaced from said inlet, a helical groove along its inner surface extending from and between said inlet and said outlet for conveying a stream of liquid from said inlet to said outlet during rotation of said vessel and for concomitantly providing a film of this liquid on the inner surface of said groove; supply means in fluid flow communication with said inlet for supplying predetermined quantities of a liquid reagent to said groove; a tube disposed in said vessel and extending longitudinally thereof for directing gas against the film of liquid in said inner surface of said groove, having an inlet for gas and a series of outlet openings along its length; supply means coupled to said inlet of said tube for supplying gas thereto, which gas is directed by said opening against the liquid reagent film for the reaction of an ingredient in the gas with the reagent.

14. Liquid-gas contact apparatus, comprising: a vessel mounted substantially horizontally for rotation about its longitudinal horizontal axis, having an inlet for liquid, an outlet for liquid longitudinally spaced from said inlet, a helical groove along its inner surface extending from and between said inlet and said outlet for conveying a stream of liquid from said outlet to said outlet during rotation of said vessel and for concomitantly providing a film of this liquid on the inner surface of said groove; supply means in fluid flow communication with said inlet for supplying predetermined quantities of a liquid reagent to said groove; a tube disposed in said vessel and extending longitudinally thereof for directing gas against the film of liquid on said inner surface of said groove, having an inlet for gas and a series of outlet openings along its length; supply means coupled to said inlet of said tube for supplying gas thereto, which gas is directed by said openings against the liquid reagent film for the reaction of an ingredient in the gas with the reagent; and withdrawal means coupled to said outlet of said vessel for withdrawing predetermined quantities of the product of the reaction of the gas with the liquid reagent from said vessel.

15. Liquid-gas contact apparatus, comprising: a vessel mounted substantially horizontally for rotation about its longitudinal horizontal axis, having an inlet for liquid, an outlet for liquid longitudinally spaced from said inlet, a helical groove along its inner surface extending from and between said inlet and said outlet for conveying a stream of liquid from said inlet to said outlet during rotation of said vessel and for concomitantly providing a film of this liquid on the inner surface of said groove; supply means in fluid flow communication with said inlet for supplying predetermined quantities of a liquid reagent to said groove; a tube disposed in said vessel and extending longitudinally thereof for directing gas against the film of liquid on said inner surface of said groove, having an inlet for gas and a series of outlet openings along its length; supply means coupled to said inlet of said tube for supplying gas thereto, which gas is directed by said openings against the liquid reagent film for the reaction of an ingredient in the gas with the reagent; withdrawal means coupled to said outlet of said vessel for withdrawing predetermined quantities of the product of the reaction of the gas with the liquid reagent from said vessel; and analysis means coupled to said withdrawal means for receiving predetermined quantities of this reaction product therefrom in the form of a stream and for continuously determining a characteristic of this stream.

16. Liquid-gas contact apparatus, comprising: a vessel mounted substantially horizontally for rotation about its longitudinal horizontal axis, having an inlet for liquid, an outlet for liquid longitudinally spaced from said inlet, a helical groove along its inner surface extending from and between said inlet and said outlet for conveying a stream of liquid from said inlet to said outlet during rotation of said vessel and for concomitantly providing a film of this liquid on the inner surface of said groove; supply means in fluid flow communication with said inlet for supplying predetermined quantities of a liquid reagent to said groove; a tube disposed in said vessel and extending longitudinally thereof for directing gas against the film of liquid on said inner surface of said groove, having an inlet for gas and a series of outlet openings along its length; supply means coupled to said inlet of said tube for supplying gas thereto, which gas is directed by said openings against the liquid reagent film for the reaction of an ingredient in the gas with the reagent; withdrawal means coupled to said outlet of said vessel for withdrawing predetermined quantities of the product of the reaction of the gas with the liquid reagent from said vessel; a flow cell coupled to said withdrawal means for receiving predetermined quantities of this reaction product in the form of a stream; and a light source and a light detector operable at a given wavelength for continuously determining the optical density of this stream.

17. A method of determining the concentration of a constituent in a gas comprising: continuously conveying a liquid reagent as a stream along a path from and between an inlet and an outlet; continuously raising liquid reagent out of the stream along the path to form a film of liquid; directing and contacting the gas against the film of liquid; continuously returning the raised, gas contacted liquid to the stream; withdrawing at least a portion of the stream containing the gas contacted liquid as a stream of liquid and continuously analyzing this stream for the concentration of a gas constituent-reagent reaction product.

18. A method of determining the concentration of a constituent in a gas comprising: continuously conveying a liquid reagent as a stream along a path in a helical conduit which is continuously turning about its longitudinal axis, thereby continuously raising liquid reagent out of the stream on the walls of the conduit to form a film of liquid and continuously returning the raised, liquid to the stream; directing the gas against the raised, liquid to contact the liquid with the gas; continuously withdrawing at least a portion of the stream containing the gas contacted liquid as a stream of liquid and continuously analyzing this stream for the concentration of a gas constituent-reagent reaction product.

References Cited by the Examiner
UNITED STATES PATENTS

| | | | |
|---|---|---|---|
| 2,721,732 | 10/1955 | Melrose | 261—112 X |
| 2,968,536 | 1/1961 | Smith | 23—254 |
| 3,028,224 | 4/1962 | Ferrari | 23—255 X |
| 3,127,254 | 3/1964 | Astrup et al. | 23—253 X |

MORRIS O. WOLK, *Primary Examiner.*

DELBERT E. GANTZ, *Examiner.*